United States Patent
Van Wieringen

(10) Patent No.: US 6,326,971 B1
(45) Date of Patent: Dec. 4, 2001

(54) INSTALLATION AND METHOD FOR CONTROLLING A MOVABLE APPARATUS

(75) Inventor: Arie Hendrik Nicolaas Van Wieringen, En Eemnes (NL)

(73) Assignee: Arie van Wieringen Video Film Productions, En Eemnes (NL)

(*) Notice: Subject to any disclaimer, the term of this patent is extended or adjusted under 35 U.S.C. 154(b) by 0 days.

(21) Appl. No.: 08/981,486

(22) PCT Filed: Jun. 27, 1996

(86) PCT No.: PCT/NL96/00264

§ 371 Date: Jan. 26, 1998

§ 102(e) Date: Jan. 26, 1998

(87) PCT Pub. No.: WO97/01803

PCT Pub. Date: Jan. 16, 1997

(30) Foreign Application Priority Data

Jun. 28, 1995 (NL) .................................................. 1000679

(51) Int. Cl.$^7$ ........................... G06T 15/70; G06T 13/00; G09G 5/34; A63H 3/00
(52) U.S. Cl. ........................... 345/474; 345/121; 446/268
(58) Field of Search .................................... 345/473, 474, 345/121, 418, 328, 302; 446/376, 140, 390, 397, 175, 268

(56) References Cited

U.S. PATENT DOCUMENTS

| | | |
|---|---|---|
| 4,600,919 | 7/1986 | Stern . |
| 4,797,836 * | 1/1989 | Witek et al. ........................... 345/121 |
| 4,827,532 * | 5/1989 | Bloomstein ........................ 345/473 X |
| 4,952,051 * | 8/1990 | Lovell et al. ........................... 345/473 |
| 5,404,316 * | 4/1995 | Klingler et al. ................. 345/418 X |
| 5,483,630 * | 1/1996 | Unuma et al. ........................ 345/473 |
| 5,495,568 * | 2/1996 | Beavin ................................ 345/473 |
| 5,506,949 * | 4/1996 | Perrin ................................. 345/473 |
| 5,680,532 * | 10/1997 | Amakawa et al. ................... 345/473 |
| 5,982,390 * | 11/1999 | Stoneking et al. ................... 345/474 |
| 6,008,818 * | 12/1999 | Amakawa et al. ................... 345/473 |

FOREIGN PATENT DOCUMENTS

| | | |
|---|---|---|
| 717257 | 9/1965 | (CA) . |
| 0 428 164 | 5/1991 | (EP) . |
| 0 520 099 | 12/1992 | (EP) . |
| 2 696 652 | 4/1994 | (FR) . |
| WO 89/09458 | 10/1989 | (WO) . |

* cited by examiner

Primary Examiner—Mark R. Powell
Assistant Examiner—Chante' E. Harrison
(74) Attorney, Agent, or Firm—Young & Thompson

(57) ABSTRACT

Installation and method for controlling a movable apparatus resembling a living being, or a two-dimensional simulation thereof, the apparatus being provided with artificial limbs, with a device for receiving a control signal and with a device for generating drive signals for the artificial limbs, which installation includes: a user interface provided with input device for the entering of commands by a user, a central processing unit which is connected via a first communications line to the user interface and includes a memory provided with movement data which are made up of series of atomic movements and can also be based on emotions, an editor for the calculation of sub-atomic movements required between the atomic movements read and the insertion of the sub-atomic movements between the atomic movements in order to make the apparatus perform a fluid movement.

16 Claims, 6 Drawing Sheets

INSTALLATION AND METHOD FOR CONTROLLING A MOVABLE APPARATUS

This application is a 371 of PCT/NL96/00264, filed Jun. 27, 1996.

BACKGROUND OF THE INVENTION

The present invention relates to an installation for controlling a movable apparatus resembling a living being, or a two-dimensional simulation thereof, which apparatus is provided with artificial limbs, with means for receiving a control signal and with means for generating drive signals for the artificial limbs, which installation comprises:
a user interface provided with input means for the entering of commands by a user,
a central processing unit which is connected via a first communications line to the user interface and comprises:
first memory means storing data as to positions of the apparatus;
read means to read data from said first memory means;
editor means to receive said data from said read means and to calculate interpolates movements between said positions and to move the character accordingly.

DESCRIPTION OF THE RELATED ART

Such an arrangement is known from European patent application 0,428,164, which discloses an animation producing apparatus for displaying a moving character, e.g. a human-like being, on a display. For calculating a desired movement, the moving character is split up in different parts such as the arms, the legs, etc. Any of these parts are assigned separate movements on separate time scales. After the separate movements have been calculated the combined movement of the character is established by adding these separate movements on one time scale. The separate movements of the parts are established by a processor which is arranged for calculating interpolating movements between "fundamental shapes" of the character read-out from a memory. "Fundamental shapes" are defined as data of fundamental configurations, i.e., predetermined poses of the character in predetermined locations. No fundamental movement trajectories, or atomic movements, are stored. Although the known arrangement is capable of controlling smooth movements of the animated character, there is still a need for perfecting the controlled movement as to appearing more human- or animal-like.

SUMMARY OF THE INVENTION

A first object of the present invention is to provide an installation for controlling the movement of a two- or three-dimensional character, looking like a living being, providing the character with an as natural, i.e. human- or animal-like, movement as possible.

The installation according to the invention forms part of a project for constructing a robot-like doll which is able to move like a person, is able to speak like a person and is able to express an emotion like a person. In this context movement is defined as a succession of positions and stances over time, speech is defined as a succession of specific sounds over time and emotion is defined as a manner of expressing movements and sounds. In the case of a doll which is able to move, speak and express emotion like a person, the movement, the speech and the emotion must be synchronised. The present invention relates to an installation and a method for enabling a doll to move like a person, partly as a function of a specified emotion and/or specified speech.

A further object of the invention is, therefore, to provide a movement editor/composer unit which can make an apparatus move in response to signals from the immediate surroundings. The control information required for this purpose must be capable of being specified at a high level. A user must be able to feed desired movements, associated with the desired emotion, to the movement editor/composer unit, which translates the specification provided by the user into control signals for the apparatus. The control signals transmitted to said apparatus result in a natural (human) movement.

A further object is that a user must be able to feed emotions, such as anger or fatigue, in conventional linguistic terms into the movement editor/composer unit, after which the latter is capable of incorporating said emotions in the ultimate movements of the doll without a completely new movement specification being required.

A further object is that it must be possible for any corrections to movement specifications to be made quickly.

Therefore, the invention provides an installation as defined above which is characterized in that,
said first memory means are storing atomic movement data as to predetermined atomic movements of the apparatus,
said editor means are arranged to calculate sub-atomic movements and to insert them between adjacent atomic movements, any sub-atomic movement to be inserted between a preceding atomic movement and a subsequent movement being calculated such that it overlaps at a starting portion with said preceding atomic movement and at an ending portion with said subsequent atomic movement, such that a combined movement of preceding atomic movement, sub-atomic movement and subsequent atomic movement is smooth and not jerky.

With this arrangement the calculation of sub-atomic movements required between the atomic movements which have been read is based not only on the end point of a specific atomic movement and the start point of the subsequent atomic movement but also on the course of the first-mentioned movement close to the end point thereof and the course of the subsequent atomic movement beyond the start point thereof. In other words, the editor as it were calculates an additional movement path which extends beyond the end of a specific atomic movement and beyond the start point of the subsequent atomic movement such that said path can be inserted as a sort of "glue" between the two atomic movements. The atomic movements can be derived from real living beings, like humans or animals, using a data suit, thus improving the natural appearance of the combined movement of the apparatus since the atomic movements can be made to be as human-like or animal-like as possible.

Advantageously, the installation is also provided with second memory means, provided with emotion movement data relating to pre-specified movements of the apparatus, which are linked to emotions of the being which the installation resembles, wherein the read means are also equipped to read from the second memory means and wherein the editor is also equipped to calculate the sub-atomic movements in accordance with an emotion entered by the user. Emotions can, for example, be reflected in specific facial expressions, that is to say specific positions of the mouth and the eyelids, which necessitate specific movements of parts of the face of. for example, a doll.

Furthermore, the installation can be provided with third memory means, provided with sound data, wherein the read means are also equipped to read sound data and wherein the editor is also equipped to calculate the sub-atomic movements in accordance with a sound entered by the user and to provide a control signal, which also contains the sound data. By adding such third memory means it is possible for the apparatus not only to move like a living being (for example a person) but also to make sounds which are associated with the living being concerned (for example speech). With this arrangement, provision can be made for the mouth of the apparatus to make movements which correspond to the sound produced.

Preferably, the editor is based on fuzzy logic so that the user can enter commands in everyday language. Nowadays fuzzy logic is a technique widely used in programming. This type of logic can be used for those problems for which no precise solution exists or which are too complex to be solved exactly. Therefore, fuzzy logic is a powerful and suitable tool for translating commands specified by a user in everyday language (for example the command "walk fast") into a fluid pattern of movement of the apparatus.

In order to create a sort of electronic viewer, by means of which the user is able, with the aid of simulations, to check the movements of the apparatus which are to be expected, the central processing unit can be provided with fourth memory means, equipped with software for simulating, on a monitor, expected movements to be made by the apparatus on the basis of the control signal calculated by the editor.

The first, second and third memories can store data relating to movements which have been acquired by means of sensors, for example in the form of a data suit, on a living test being.

The invention also relates to a method for controlling a movable apparatus resembling a living being, or a two-dimensional simulation thereof, which apparatus is provided with artificial limbs, with means for receiving a control signal and with means for generating drive signals for the artificial limbs, in accordance with the following steps:

the entering of a command via a user interface provided with input means,
reading of data relating to positions of the apparatus from first memory means in accordance with the command entered by the user,
the calculation of interpolated movements between said positions and to move the character accordingly,
characterised by
reading atomic movements from said first memory means, calculating sub-atomic movements and to insert them between adjacent atomic movements, any sub-atomic movement to be inserted between a preceding atomic movement and a subsequent movement being calculated such that it overlaps at a starting portion with said preceding atomic movement and at an ending portion with said subsequent atomic movement, such that a combined movement of preceding atomic movement, sub-atomic movement and subsequent atomic movement is smooth and not jerky.

Further advantageous methods according to the invention are indicated in further dependent claims.

BRIEF DESCRIPTION OF THE DRAWINGS

The invention will be explained in more detail below with reference to a few drawings, which show the underlying principles of the invention diagrammatically, without, however, suggesting a restriction of the scope of protection.

DESCRIPTION OF THE PREFERRED EMBODIMENTS

Figure 1:
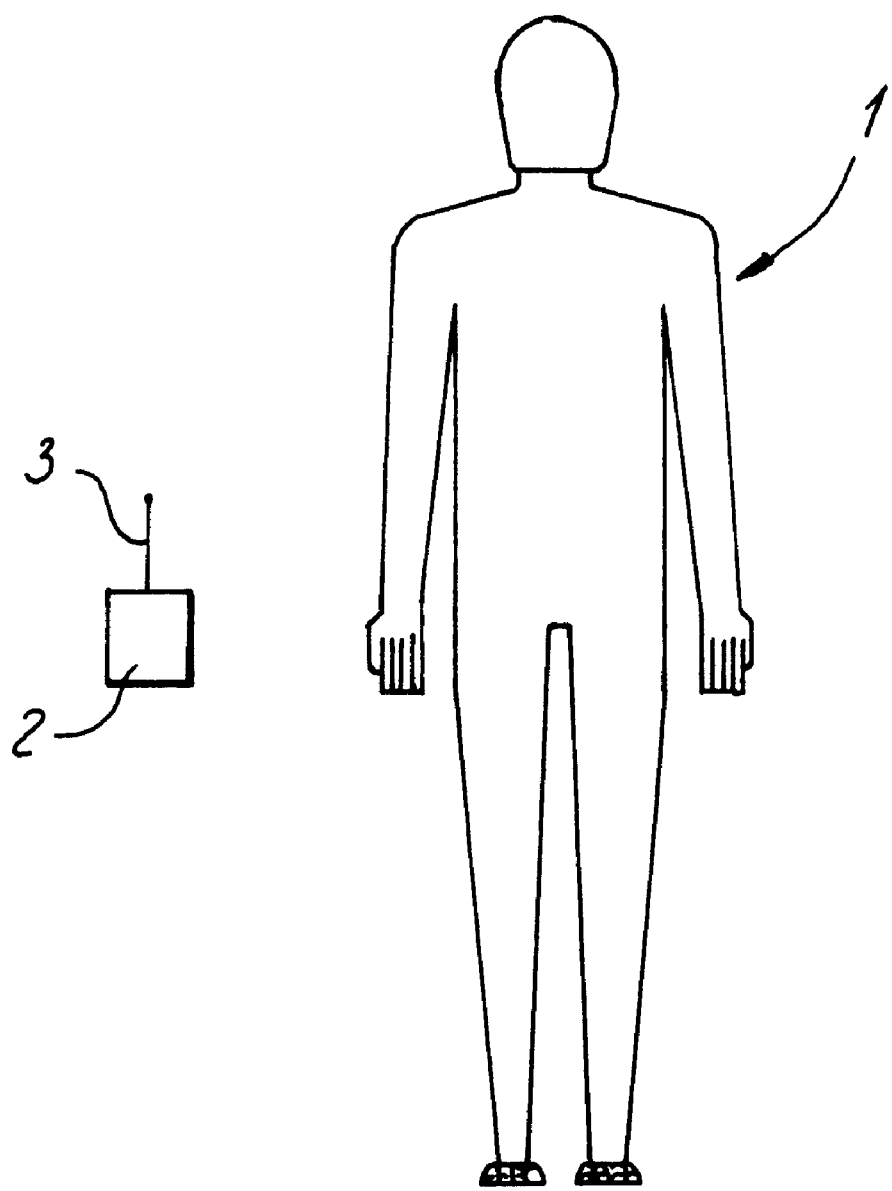
FIG. 1 is a diagrammatic representation of a robot-like doll.

FIG. 1 shows, highly diagrammatically, a doll 1 which is made up of various limbs; some of the limbs are able to move relative to adjacent limbs in three independent directions from one another, such as the forearm relative to the upper arm, whilst others are able merely to turn in one direction relative to an adjacent limb, such as the lower leg relative to the upper leg. A recorder on which previously specified instructions for the doll 1 have been saved is indicated diagrammatically by reference numeral 2. In practice, the recorder 2 in accommodated in the body or on the body of the doll 1. The recorder 2 is provided with an aerial 3 for communication with a user.

Figure 2:
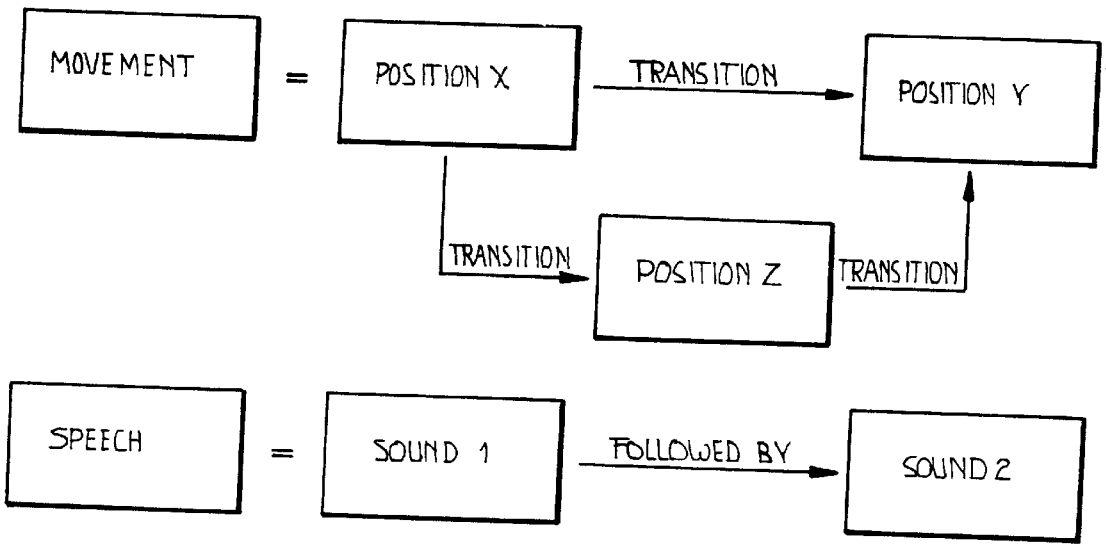
FIGS. 2 to 4 are block diagrams to illustrate the functioning of the present invention.

FIG. 2 shows diagrammatically that a specific movement can be defined as the transition from a specific position x to a specific desired position y. In this context, it is also shown in the top half of FIG. 2 that a position z can be defined between position x and position y, via which position z the transition from position x to position y must proceed. The duration of a movement partly depends on the number of transitions between position x and the desired position y. However, because the transition from position x to position y must as far as possible resemble a natural transition (that is to say a transition resembling that in a person), limits are imposed on the various transitions in the top half of FIG. 2 and the duration of a movement is mainly determined by the duration of the transitions between the various positions.

The bottom half of FIG. 2 shows that speech can be defined as a succession of different sounds. In the case of speech, the duration is determined mainly by the duration of the various successive sounds.

Figure 3:
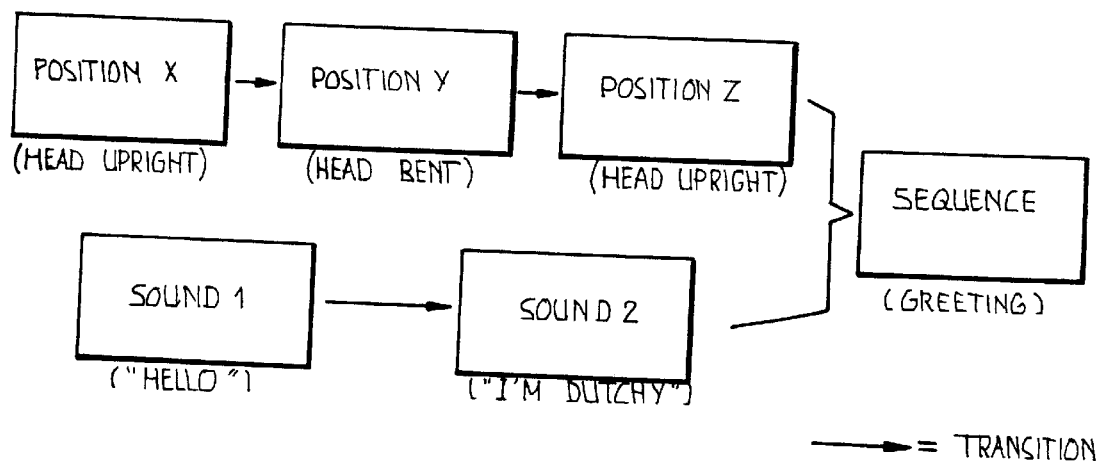

FIG. 3 shows, diagrammatically, that a specific action by the doll 1 can be split up into diverse sub-actions. The action of "greeting", which is termed a sequence here, can, for example, be split into three successive positions of the head (position x, position y and position z) and two successive sounds (sound 1 and sound 2). In this case, position x is defined as the position in which the head of the doll is upright, position y as the position in which the head is bent and position z as the position in which the head is upright again. At sound 1 the doll speaks the word "Hello", whilst sound 2 corresponds to the words "I'm Dutchy". In this context, FIG. 3 also shows diagrammatically that sound 1 must be produced on the transition from position x to position y, whilst sound 2 must be produced on transition from position y to position z. This is because this type of pattern as a function of time gives the doll a human presence.

Figure 4:
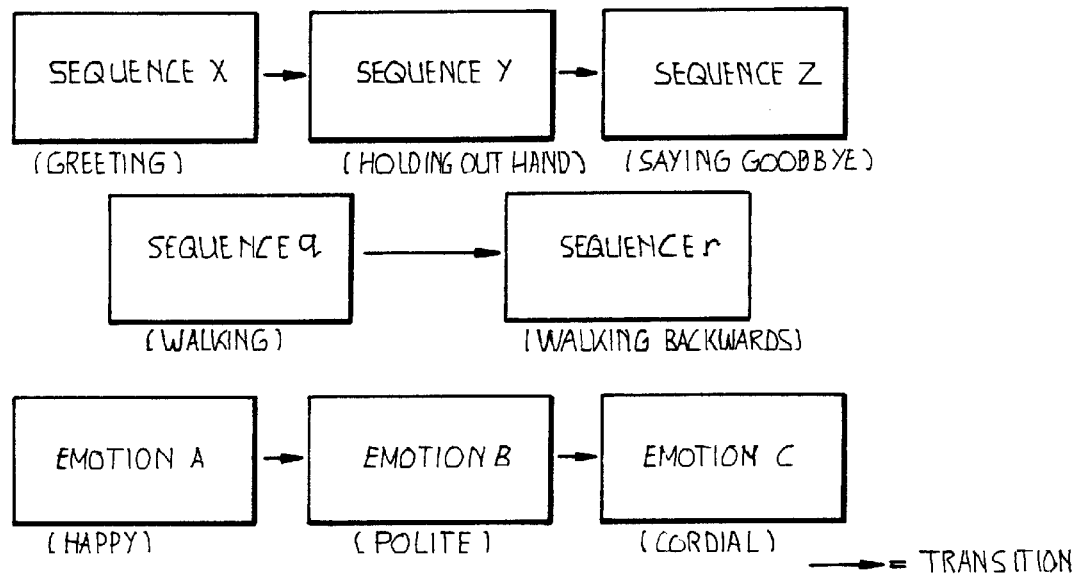

FIG. 4 shows that various sequences (actions) can be linked. FIG. 4 also shows that various limbs can move in parallel as a function of time. Sequence x indicates a greeting action, as is shown diagrammatically in FIG. 3. The greeting action is followed by a sequence y, in which the doll holds out its hand. Sequence y can, in turn, be followed by a sequence z, in which the doll says goodbye. Sequence y and sequence z each comprise predefined positions, just like sequence x. The doll can be programmed to walk forwards (sequence q) while greeting (sequence x) and holding out its hand (sequence y). Similarly, the doll can be programmed to walk backwards (sequence r) after holding out its hand (sequence y) and saying goodbye (sequence z). Sequences q and r likewise each consist of various pre-programmed positions, just like sequences x, y and z.

FIG. 4 also shows that various types of emotions (emotion a, emotion b and emotion c) can be programmed for each of the sequences x, y and z. For instance, greeting can, for example, be in a happy manner (emotion a), whilst holding out the hand can be done politely (emotion b) and saying goodbye is cordial (emotion c).

The doll 1 preferably receives its input data via wireless communication via aerial 3. The input data preferably comprise angle differences for all joints between the adjacent limbs of the doll related to a specific starting position of the doll 1, combined with sound, so that the doll is able to speak. The angle differences for the various joints consist of pre-saved data and/or data generated instantaneously, as will be explained below.

Figure 5:
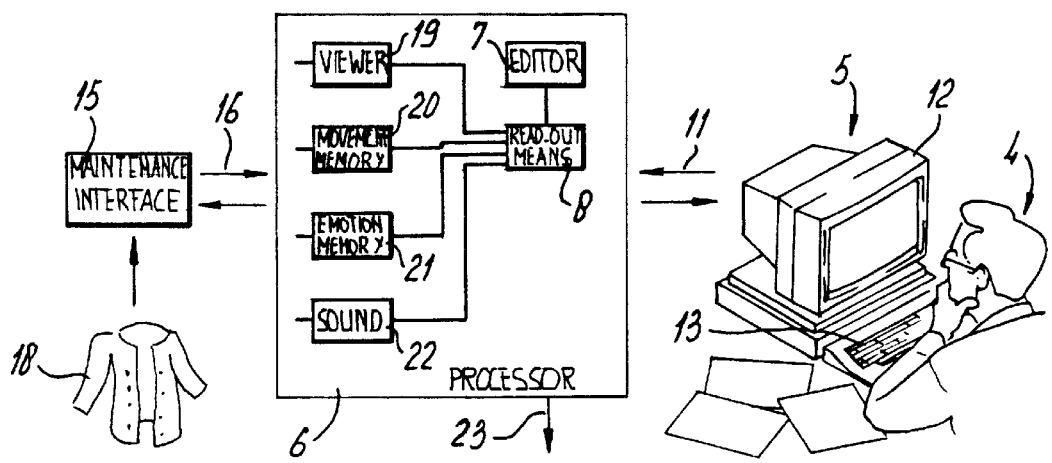
FIG. 5 is a diagrammatic representation of the structure of a movement editor/composer unit.

New movements of the doll 1 are specified by a user 4. FIG. 5 shows the user 4 within the general structure of the movement editor/composer unit. The user 4 communicates with a central processing unit 6 via a user interface, which, for example, consists of a personal computer 5, which is shown diagrammatically, equipped with a monitor 12 and a keyboard 13. Communication with the central processing unit 6 proceeds via a bidirectional communications line 11. The central processing unit 6 comprises at least an editor 7 and a reader 8, the functioning of which will be explained below. The central processing unit 6 is also provided with various memories: movement memory 20 for storing standard movements, emotion memory 21 for storing emotions, sound memory 22 for storing data relating to sound and a general memory 19. Of course, other memory means for storing other data can also be provided.

The structure for the movement editor/composer unit also comprises a maintenance interface 15 for communication with an operator, who, for example, desires to add new information to the memories 19 to 22. To this end, the maintenance interface 15 is linked to the central processing unit 6 via a bidirectional communications line 16. New information relates, for example, to a new type of movement, which has been recorded with the aid of a moving test person fitted with sensors. This can have been conducted with the aid of a so-called "data suit" 18. Such a data suit 18 comprises various, for example a hundred, sensors, which record the movements of a test person. The sensor signals record information relating to the spatial position of limbs at predetermined times. The central processing unit 6 produces an output signal 23, which is a control signal for the doll 1 in order to make the doll 1 move in the manner specified by the user 4.

The design and the implementation of a software package for simulation of movement of human beings is described in general below. Parts of the movements which can be made consist of a group of "atomic" movements, that is to say basic movements which have been prerecorded by an operator, by means of which the construction of all possible movements is made possible.

Recorded movements are available in the memories 20 to 22. Movements can vary in length from one to several thousand frames. Each second of animation comprises a fixed number of frames.

New movements can be generated using the editor 7. These new movements are combinations of an arbitrary number of "atomic" movements. Each movement can be adapted by adding movements as a consequence of a specific emotion and/or speed thereto. The transitions which have to be generated in order to combine atomic movements must result in a human movement. Preferably, an electronic viewer is provided in order to check the results.

The program developed can be subdivided into two different phases: an offline phase and an online phase. In the offline phase, movements can be changed, combined, added, etc., in order to form new movements. In the online phase, each movement takes place in real time. In the online phase there is less calculation time available to be able to make adjustments, with the result that the possibilities for changes are therefore limited. In order to be capable of performing a movement in real time, a movement is stored as successive positions with respect to time.

The structure of the human body is highly complex. A model of human movement is therefore also particularly complex. When use is made of a model, which comprises only the most essential information, it is possible to simulate certain movements of the human body. The model must, inter alia, contain information with regard to the dimensions and weights of the limbs, as well as of the upper and lower limits of the possible angles of the joints.

For example, use can be made of a segment model of the human body, in which the human body is represented by, for example, twenty-three segments. Each segment consists of one limb, which is of a specific length and has one joint, which is able to undergo specific rotations with respect to adjacent limbs.

The degrees of freedom of a limb are determined by the rotation possibilities of the joint in three independent directions, which can be designated by "yaw", "pitch" and "roll". The yaw angle is the rotation in the transverse plane, the pitch angle is the rotation in the sagittal plane and the roll angle is the rotation in the frontal plane. Each direction has a minimum and a maximum deflection. If there is no deflection in a specific direction, the minimum deviation is equal to the maximum deflection.

Movement is generated by changing the yaw, pitch and/or roll angles. As long as the angles are within the deflection limits, a movement is generated which can be executed by a human body. In order to make the movement appear human, the angles must change in accordance with predetermined rules. This prevents a movement being generated which, although it is human, does not appear to be human.

A jerking movement must be avoided when generating a movement pattern for the doll 1. Jerking is defined as the speed of change of the acceleration, or the third derivative of the location. The smoothest movement between two points is that which minimalises jerking. In reality, the minimum can never be the actual minimum because the movement in that case would last for an infinite time. In practice, the value used is the minimum value possible at the desired speed.

In addition to jerking as a parameter for a movement to be generated, the position of the mass centre of gravity is an important parameter. The mass centre of gravity is able only to assume a position from a group of predefined positions with respect to the feet of the doll 1 in order to prevent the doll 1 from losing its balance.

People move differently when they feel differently; in other words they move "emotionally". Someone who is angry moves in a different way to someone who is happy or sad. Variations in speed can also arise under the influence of emotions. This means that the way in which a given movement appears with respect to time can vary. Sometimes the emotion has an effect only on the speed of a movement, but sometimes the emotion also influences the movement itself. Changes in speed can also lead to a different movement, for example because of mass inertia.

A relatively long movement by a person can usually be subdivided into smaller movements. The relatively long movement can be considered as a series of smaller movements which are linked by means of transitions, as is illustrated in FIGS. 2, 3 and 4. A movement can, for example, be subdivided into the three steps of walking, sitting and eating. Each of these smaller movements can, in itself, in turn be subdivided into "atomic" movements, which are the smallest identified movement units. Walking, for example, can be regarded as a series of steps. This means that a movement can be subdivided into "atomic" movements with a predefined start point and end point. The end point of a movement and the start point of the following movement must be linked to one another by means of a transition movement, which must appear human. The start point and the end point must, as it were, be "glued" to one another, which is the task of the editor 7 (FIG. 5).

The successive movements with the intermediate transitions together form a path which a joint must follow in order to complete the movement. Usually more than one joint is used in order to perform a certain movement, which means that there are various paths which identify a specific movement. For each of these joints, the path must be translated into yaw, pitch and roll angles.

The most significant problem here is that a description of a movement, specified by a user 4 in normal everyday language, must be translated into movements of the doll 1. The movement can already be available in the memories 20 to 22, but this does not have to be the case. If this is not the case, the movement must be calculated.

In other words, the user 4 thinks in terms of everyday language while the computer requires precise values. These two usually do not rhyme with one another. Because the translation from the one domain into the other domain is not a 1:1 relationship, a certain trick in translation is needed. The use of "fuzzy logic" is a powerful tool for doing this, because this type of logic is able to work with natural concepts. Such natural concepts can relate to the emotion of a person. The use of "fuzzy logic" will be explained later in the description.

Emotions are usually subdivided into seven general groups: surprise, anxiety, antipathy, anger, joy, sorrow and neutral. These emotions and combinations thereof form all possible emotions. Other emotions, that is to say other words for specific emotions, must be expressed in terms of these seven basic emotions. Of course, everyone has his or her own interpretation of an emotion, and new emotions must therefore be specified for each new person. Once these new emotions have been described, they can be added to any arbitrary movement group. If there is no movement available for a specific emotion, the editor 7 itself can make an attempt and retrieve other movements from the movement group and use these for the functionality concerned. The editor 7 must therefore possess a certain degree of intelligence in order to be able to perform its task. The editor 7 must be capable of selecting the correct atomic movements for the specified movement. Of course, there is no guarantee whatsoever that the combined movements will result in correct behaviour. This is highly dependent on the movements which are already available in the memory and on the possibility of matching to one another the movements which have been selected by the editor.

The use of natural everyday language as the input means is associated with the problem that a movement can be expressed in various ways. The expressions "walk fast" and "run" point to the same movement, but there is (as yet) no link between these concepts. However, such a link can be created by using "fuzzy logic". with the result that the editor will then be a powerful instrument, because by adjusting, for example, "speed", a different movement group will be investigated without any interaction with user 4.

Figure 6A:
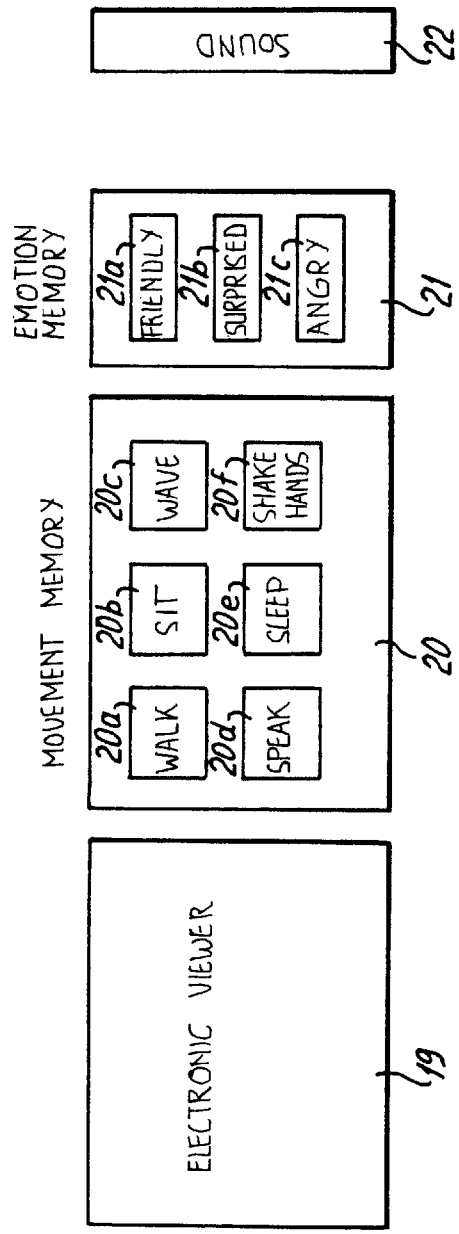
FIG. 6a is a diagrammatic representation of a memory configuration for the central processing unit.

FIG. 6a shows a possible configuration of the memories belonging to the central processing unit 6. Various movement paths, which correspond to a human movement, are stored in the movement memory 20. Memory area 20a, for example, contains position data relating to the "walking" movement, whilst memory area 20b contains position data relating to "sitting", memory area 20c position data relating to "waving", memory area 20d position data relating to "speaking", memory area 20e position data relating to "sleeping" and memory area 20f position data relating to "shaking hands".

As pointed out above, each of the movement paths can be split up into atomic movements.

The emotion memory area 21a contains, for example, position data relating to the emotion "friendly". These position data can relate to the attitude of the body, but particularly to the position of the lips and the eyelids. A head for a robot which has been formed in such a way that the face thereof is able to express various emotions in terms of the seven basic emotions defined above has been previously described, for example, in H. Kobajashi, et al., "Study on face robot for active human interface", I.E.E.E. International Workshop on Robot and Human Communication, Science University of Tokyo, 1993.

In memory area 21b, for example, movement paths associated with the emotion "surprise" are stored, whilst in area 21c movement paths associated with the emotion "angry" are stored. Of course, the emotion memory also contains other memory areas in which movement paths for the other basic emotions are stored.

Figure 6B:
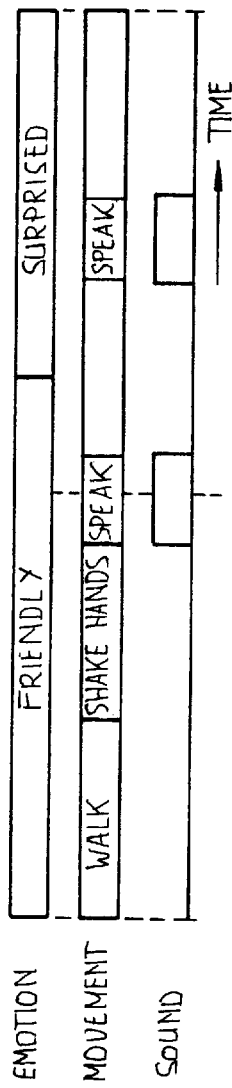
FIG. 6b is a diagrammatic representation of a movement of a doll over time, together with a specific emotion and with specific speech.

When the recorded data are played back through the doll 1 in real time, three layers must, as it were, be superimposed, namely sound (speech). movement and emotion. The various aspects are shown in more detail in FIG. 6b, in which these three layers are illustrated by an example over time. The doll 1 can, for example, have been programmed to walk, to shake hands and to speak for a predetermined period, during which the doll 1 is also friendly. Said predetermined period can, for example, be followed by a subsequent period in which the doll 1 speaks while he is surprised. The associated movements are now as far as possible read from available standard movements, whilst the intermediate transitions must be calculated with the aid of the editor 7 (FIG. 5).

In order to make full use of the doll 1, movements must be programmed beforehand. This means that a value must be assigned to the yaw, pitch and roll angles for each joint for a specific movement. It will be clear that for a human doll which has, for example, more than twenty joints, this is a very complex task, or even impossible. However, various methods are available for making the doll 1 move without every joint having to be programmed.

The first method relates to the recording of the movement which is made by a test person. The test person performs the movements which the doll 1 is to make, the test person wearing a so-called data suit 18, as has already been explained above. The yaw, pitch and roll angles are determined by the data suit. These joint angles are then added to the doll 1. This method is complex, expensive and slow, because every movement has to be performed and recorded beforehand. If use is made of this method only, the consequence is also that movements cannot be adapted, with the result that if a somewhat different movement than a movement already recorded has to be made, the new movement has to be recorded as a whole. Moreover, emotions cannot be added to a recorded movement, with the result that a specific movement associated with a single concept, for example "walk forwards", has to be programmed for each associated emotion.

The second possible method relates to a specification of a movement at high level. This means that a complete description of the movement is given. The movement itself is then calculated in accordance with the data specification and is used as input for the doll 1. Each specified movement can then be performed and adapted for each emotion and each speed. This method requires a long computation time, because the values have to be calculated for each joint. All characteristics of human movement and the mechanical characteristics of the human body must likewise be taken into account. Another disadvantage of this method is that it is not possible to specify every movement at a high level. Some movements cannot be specified because they are too complex. Consequently, movements of this type cannot be performed using this method.

The third method is a combination of the two preceding methods. In this third method the desired movements are performed by a test person, who is wearing a data suit 18. The movements performed by the test person are recorded and, for example, stored in the movement memory 20 via the maintenance interface 15 (FIG. 5). It is then possible to specify a specific desired movement at a high level and to make use of the information stored in the movement memory 20. The recorded movements are linked to one another with the aid of the editor 7 in order to create the desired movement. The movements calculated in this way can be used as input data for the doll 1. The advantage of such a method is that it is not necessary to record each movement in its entirety at each point in time or to calculate an entire movement. A disadvantage of this method is that the movement memory 20 is in fact provided with atomic movements, with the result that the transitions between the various successive atomic movements must be calculated in such a way that the entire movement still appears human. Moreover, it must also be possible to adapt the atomic movements depending on limitations which are determined by emotions. This third method is more flexible that the first method and takes appreciably less computation time than the second method.

To summarise, according to the abovementioned third method the movement editor/composer unit performs the following steps:

1. movements are recorded with the aid of a test person who is wearing a data suit 18;
2. the recorded movements are stored in the movement memory 20, either in their entirety or split into diverse atomic movements;
3. if a new human movement has to be created, use is made of the movements and atomic movements from the movement memory 20.

New movements are designed by specifying the desired movement and the desired emotion at a high level. The specified movement can, as stated, have been subdivided into atomic movements, which are present in the movement memory 20. The reader unit 8 reads these atomic movements from the movement memory 20, account being taken of the desired speed and the specified emotion. The specified emotion may add limitations to a specified movement and/or add movements by other limbs (for example by the face). It can be that a specified movement has already been recorded with the specified emotion, so that the relevant movement as a whole can be read from the movement memory 20. If not, the movement must then be assembled by the movement editor/composer unit itself.

After all necessary movements available in the movement memory 20 have been read, they must be combined, so that a single fluid movement is produced. This is possible only if there are no conflicts in the specifications of the movement. Conflicts can, for example, exist when two or more movements have been specified for the same limb or when two different limbs have to be in the same location at the same point in time and a collision is thus unavoidable. Such collisions must be established before the relevant movements are performed. If there are no conflicts, a fluid movement can be generated.

In order to be able to predict desired movements in advance, it is desirable to also have access to an electronic viewer by means of which desired movements of the doll 1 can be simulated and can be shown to a user. An electronic viewer of this type can, for example, have been implemented in the memory 19 of the central processing unit 6. The simulated movements can then be displayed three-dimensionally on the screen 12. The electronic viewer is intended to provide the user 4 with an instrument to enable recorded movements and generated combinations of sub-movements to be observed from various viewing angles. This can afford an aid when interrupting existing movements and making parts of existing movements flow into one another. Moreover, a created movement can be followed in real time, which makes it possible for the user to correct movements as required.

Various tools are known which can be used as electronic viewer, for example the AVS program. This is a highly complex program which provides a very powerful viewing system. In addition there is an animation program named "JACK" which has been developed for the purposes of ergonomic requirements in respect of installations with which people have to work. The "JACK" program provides a detailed three-dimensional image of a human figure.

When displaying a simulated movement with the aid of the electronic viewer, use is made of the stored movements in the movement memory 20. The movement memory 20, as well as the emotion memory 21, can contain information for various dolls of different dimensions.

The program for the electronic viewer can be subdivided into two different phases, namely the online phase and the offline phase. In the online phase a stored movement is played in real time with the aid of the electronic viewer. The output signal for the electronic viewer can, if desired, also be fed to the doll 1. In this phase the possibilities for interaction with the user 4 are restricted because a substantial proportion of the available computation time is already being taken up.

In the offline phase, the user has complete control over the desired movements. In this phase the movements are edited, stored, rendered visible as desired, etc.

In order to generate a complete movement, movements stored in the memories must, as stated, be "glued" together by fluid transitions. This "gluing" together is more than the simple linking of atomic movements from the memory to one another, because it is probable that the end point of one atomic movement does not fit with the start point of the subsequent atomic movement. A transition must be calculated which is not solely dependent on the start point and the end point of the atomic movements. In order to obtain a fluid transition, the end of one atomic movement, and the start of the following atomic movement must also be studied.

The transition to be calculated cannot be read from the memory. The transition is automatically inserted between two successive atomic movements which have to be linked to one another. How long the transition has to be depends on the two successive atomic movements. It is therefore not possible to estimate in advance the length of time the calculation of the transition will take. More time will be needed when the distance between the end point of one atomic movement and the start point of the subsequent atomic movement increases. In addition, the transition also depends on the emotion specified by the user, because the emotion imposes restrictions on the movements to be performed and may require additional movements by other limbs, such as movements of the mouth and the eyelids.

To generate a fluid movement it is not sufficient merely to calculate a fluid transition between the end point of one atomic movement and the start point of the subsequent atomic movement. The start of the transition must accurately follow the pattern of the first movement and the end of the transition must follow the pattern of the second atomic movement. Therefore, the transition must in fact start before the end point of the first atomic movement and end after the start point of the second atomic, subsequent movement. If one of the atomic movements is very short, it can be that the calculated transition completely overlaps said atomic movement. This means that the pattern of the entire movement before and after said short atomic movement must also be followed.

Thus, it is possible to generate new movements by linking short atomic movements to one another. The calculation of sub-atomic movements required between the atomic movements which have been read from the memories 20–22 and the insertion of such sub-atomic movements between the atomic movements which have been read, in order to make the apparatus perform a fluid movement in accordance with the command entered by the user, is the task of the editor 7.

The movement memory 20 can at all times be supplemented by movements performed by a test person, by means of data suit 18. The body positions detected by the sensors in the data suit 18 can either be supplied directly via the maintenance interface 15 to the central processing unit 6 or can first be saved on data carriers suitable for this purpose, such as a floppy disk, which can be read by the maintenance interface 15. In a similar way it is possible, for example, to collect data relating to facial expressions associated with specific emotions by means of sensors applied to the face of a test person. Said facial expressions can then be added via the maintenance interface 15 to the emotion memory 21.

Likewise, movements of the jaw and the lips associated with pronouncing a specific word can be recorded with the aid of sensors and the associated data saved, in addition to the data relating to the sound itself, in the sound memory 22 via the maintenance interface 15.

When two or more movements have to be performed by different limbs at the same point in time, a stacking techniques used to control these simultaneous movements. Because a moving limb can affect the movement of other limbs, additional limitations are imposed on the other limb movement. If a specific movement for a specific limb has been specified, it is probable that other limbs will likewise have to move in order to make possible the movement specified for that limb. This is translated into additional limitations in respect of the possible yaw, pitch and roll angles of the joints concerned.

When a specific movement is generated this does not have to be correct. The editor therefore provides a facility for editing a generated movement. Editing can, for example, relate to the speed or the associated emotion. Editing can be carried out either offline or online. In the case of online editing it is possible only to add slight changes to the program which is running because the available computation time is then shorter.

Some movements are different for different emotions. For instance, a person walks differently if he is happy than when he is angry. Therefore, the memories contain different movements which are associated with different emotions. If a specific emotion is selected, the movement associated with that emotion is read from the memory. During the online phase the expression of an emotion can be edited only within the selected emotion. If, for example, a movement is performed within the emotion "sad", this emotion cannot be changed to "happy" during the movement.

The same applies in the case of speed. A desired movement can have been saved for various different speeds in the memory 20. During the offline phase assumptions are made with regard to the speed. During the online phase the movement which is associated with a specific selected speed can be edited only within the restrictions of the movement associated with that speed, as stored in the memory 20. For example, during a movement it is not possible to change fast walking to slow walking.

The editor can have been programmed to make a correct selection with regard to emotion or speed if this is not specified by the user 4.

Routines have been been developed for the creation of new movement through combining prerecorded movements which are stored in a library. This combination should result in 'human (or animal) movement', which means that the movement which is generated by the routines should approach real human (or animal) movement well.

The routines are not meant to be used for generating human (or animal) motion from scratch. The movement created by the routines resembles human (or animal) movement, but it is not guaranteed that humans perform the movements the same way.

The data, necessary for combining movements, is provided by the user interface. This means that the user interface passes the id's of the movements to be combined to the routines. The routines retrieve the data from the library. The movements which are created by the routines are stored in the library, and the corresponding id is returned to the user interface.

Emotions and velocities are so called modifiers. They all have their own influence on movements. There is no way to describe the influence so it has to be deduced (if this is possible at all) from existing movements with that emotion and velocity.

When specifying movement, it is possible that the particular combination of emotion and velocity with this motion will not be available in the library.

An elegant method to react to this situation is to find the movement(s) which fit best, but now the desired emotion and velocity are taken into account. The motion itself will not be examined. The criterion on which a movement is to be selected, depends on the similarities of the desired emotion and the emotion of the movement. The same holds for the velocity. Therefore some knowledge has to be provided for determining conformities between emotions. For different motion groups there could be different constraints for comparing emotions and velocities.

An extension to the last two methods consists of making connections between motion groups which are slower (or faster) versions of the other (in natural language).

Because the numbers of emotions and velocities are almost infinite, they can only be specified with the help of the user. They will have to be specified in natural language, and can be added to by giving a description in one or two words.

With the knowledge that there are just seven basic emotions, any new emotion should be given in relation to each of the basic emotions. The user will have to specify the new emotions and their relations. To stay at the level of natural language, a fuzzy set of keywords will be provided to specify the relations.

This last method could be extended into specifying the relationships with the emotions which have instinctively a relationship with the current emotion. This means that not all relations with the basic emotions will have to be specified, because most will not have any relation with the new one.

Velocity does not have this complex relationship. A new velocity can be assigned a value on a linear scale.

The goal of the library is to provide a complete set of movements, emotions, velocities, and sounds.

Knowing that it is impossible to take a motion with neutral emotion to retrieve this motion with an arbitrary emotion, it is clear motions will have to be recorded with different emotions.

With velocity it is a little bit easier. Slight changes in velocity lead to slight changes in the movement, but when the velocity increases or decreases more and more, the movement alters into a new one.

This knowledge can nevertheless be imitated. It is far less complex to record the two different motions and try and find intermediate movements by combining the two recorded motions.

Now that there are motion groups, should a group be divided into smaller parts storing just one motion, and one emotion with several velocities, or one velocity with several emotions? A problem of this method is, that in general there will be far too few movements in a single file, so combining new movements from existing ones would demand a table in which the existing movements are gathered. Otherwise the program does not know which movements of a particular motion exist. An advantage of this method is a particular movement can be found in linear time.

So the method will be to build motion groups, and storing these in distinct files. Such a file would contain this particular motion with any emotion combined with any velocity.

Sounds are a special case. They just have to be recorded and stored. They cannot be modified like movements, so anything the figure has to say, should be recorded.

The editor 7 is the tool in which movement can be specified in natural language. Movements consist of notion, emotion, velocity and sound. Therefore only descriptions can be given for movements. These are not used by the program, meaning that the descriptions are not understood by the program. They are only given as an aid to memory. They can be used to select and specify movements etc.

A default movement is always specified. The default motion is constructed by the program from little movements. They are randomly chosen from a library with little movements and can be shifted in time when the movements would interfere with the desired movements. It may contain all kinds of different motions, like breathing and blinking.

The editor 7 is the tool which ultimately will accept or reject the movements. In the first instance it will try to find the specified movement. When this fails, other combinations of emotion and velocity will be found which replace the desired combination, using the descriptions. The low level layer is then required to combine these combinations into a new movement. The result will be presented to the user.

To specify movement, timelines are presented on which the desired actions can be placed. There are two options of choosing movements from the library. They can exactly be specified by picking a motion with the desired emotion and velocity out of the library. But when this movement does not exist, it cannot be chosen but only selected by specifying this motion group. The default emotion and velocity will be taken.

Pasting and stacking are very different operations indeed. Pasting in general works on fewer movements than stacking. Pasting only has to glue two different movements together. But all movements specified at a particular time, have to be stacked. Actually, the low level layer will not know how many movements have to be stacked.

A program consists of one long action, which can be unfolded. The editor 7 can be used to combine motions, emotions, velocity and sound. Movements which consist of smaller motions can be unpacked, retrieving those smaller motions. This way parts of generated motions can be used to create new ones. As long as there are combined movements, unpacking can be done.

There can be just one overall emotion at a time. When two combined movements do not have exactly the same emotion, the strongest movement (with the highest priority) will supply the emotion. But when unpacking is done, the original emotions are restored.

There can exist several velocities at a certain time. But for one segment only one velocity will survive. As with emotion, the strongest movement will supply the velocity.

The viewer will be a helpful tool in creating new movements. It will be useful to strip recorded motions and select parts of movements. It is even impossible to do without it when checking the results of the specification of movements.

The viewer should be able to traverse a certain path to show the figure from different points of view when performing a movement. These paths are called traces.

The user should be given the possibility to specify the configuration of a model. A method for retrieving the configuration of a model is by using the properties of the segment model. This model can be viewed as a sort of tree, where the base is randomly chosen as the pelvis. Every segment consists of one joint and one 'bone'. From the base the limbs form the branches.

The smallest structure in the model is a segment. A segment is a combination of a limb with a corresponding joint. To build the structure of a model, segments have to be connected. Each segment, except for the base segment, has an ancestor segment. The ancestor segment is the segment which connects the current segment to the model. Each segment can have a number of descendants.

Motions which are performed by humans can roughly be divided into two groups: cyclic motions and non-cyclic motions.

Because the sampling rate is constant, and therefore the time per frame is constant, cyclic motions at different speeds also need different numbers of frames. One cycle of e.g. 'walking slow' may take 60 frames, where e.g. 'walking fast' may only need 40 frames. This means that when new motion is created, the frame time of this motion also has to be constant. A technique to create motion with a constant frame time is scaling. When a motion is scaled, frames are added to or removed from the motion. Scaling is used in two ways. The first way is when motion is recorded with another frame time than the frame time that is used in the software. Scaling is also used, when notion has to be created at a speed which is not available in the library. This new notion has to be created from motion which is available in the library.

In the user interface, a story board is designed. This means that the user chooses motions from the library and puts these onto a timeline. The position on the timeline where the notion is placed, sets the starting time and ending time of the notion. When the program is designed, an event list is generated by the user interface. This event list is then sent to the motion routines.

In these routines, the event list is analysed to determine where the stacking and pasting should take place. When this is determined, the stacking and pasting is done. The stacking and pasting results in a set of library motions. These library motions are used to create the motion specified in the story board.

Because the point from which the motion should be started or the point where the motion should end differs all the times, the starting and ending of the notion cannot be added to the library. When the cyclic motion starts, the body is usually not in the state which is required for starting the movement.

There are two ways to start a cyclic movement. The most simple way is moving from the current attitude to the posture of the first frame of the movement; only a transition from the current posture to the starting posture has to be calculated. An other method is to create a transition from the current state to the state which matches best. The transition which is created this way is shorter than the transition calculated with the first method. The best match is found by calculating the distance between the current posture and the posture of every frame of the cyclic motion. The distance is calculated by subtracting the values of the corresponding joints in both postures. The absolute values of the differences are added. The result of adding all differences gives the distance between the two postures.

Stacking of motions means the control of the limbs, when several motions are specified at the same time. To handle these concurrent motions correctly, priorities are assigned to the motions.

When two or more motions are performed at the same time, the angle values of a joint way be changed by more than one motion. Because at one moment the values of the angles of a joint can have only one value, a choice has to be made for the value of the joint. The more motions are carried out at the same time, the more difficult the stacking will be.

Some library motions contain information about limbs which are not necessary for the motion itself. E.g. in the library notion 'walk' the main limbs are the limbs that are necessary for walking. The motion of the arm is not necessary for walking, but most people move their arms when walking. The arm motion is therefore added to the library as a default-motion. These default-motions have a low priority, which means they are overridden by any specified motion.

At the same moment several motions can be specified for a certain limb. Because only one notion can be made at a time, a motion needs to be chosen. This can only be done if it is clear which motion is the right one. Each motion is assigned a priority to be able to make the right choice.

There are several types of motion. The 'rest' motion is the motion which is made when no other motions are specified. The rest motion is automatically chosen by the software. This motion is replaced by any specified notion. Therefore the rest motion has a very low priority. The so called default-motion is assigned a higher priority because it replaces the rest motion. Another class of motion is the motion of limbs induced by the motion of another limb. This motion is assigned a higher priority than the default-motion, because the motion has to be made to move another limb. The highest priority is assigned to directly specified motions.

Scaling of motion means that frames are added to the motion or removed from the motion. Scaling is done to change the frame time, or change the number of frames in a motion.

Scaling also needs to be done when a non-existing motion is created by combining two existing motions. The two motions can only be combined when they have the same number of frames. Both motions should therefore be scaled to the number of frames of the new motion before they are combined.

Scaling can be done by averaging frames. When frames have to be added, new frames are created by copying the original frames or by combining frames. A factor is used to indicate the weight of each original frame in the averaging. How much of each frame is used, depends on the starting and ending time of the original frames and the starting and ending time of the new frame. These starting and ending times need not be absolute times. The times can also be a ratio between the old frames and the new frame. When frames have to be removed, frames are also combined to create a new frame.

The intelligence is part, amongst others, of the way in which the definition of movement has to take place. The intention is to use natural language which will simplify the use of a user interface. The program needs a certain kind of intelligence to know for example, what 'walking fast and silly' means. In this statement three parts can be recognized: 'walking', 'fast' and 'silly'. 'Walking' represents a description of a recorded motion: For this, no intelligence is needed. 'Fast', on the other hand is a velocity, a modifier of the neutral motion. This kind of speed should represent for any recorded motion (almost) the same velocity. For the emotion 'silly', the same holds: 'silly' should represent for any motion more or less the same emotion. This would be of no interest if every motion would be recorded; however this is not the intention. If there are enough motions recorded and stored in the library, new motions will have to be created from the existing ones. For the program to know what a certain motion will look like, it has to know how the specified emotion and velocity are related to other emotions and velocities. Only then, it is able to create a new movement from existing ones.

Before discussing the way to connect natural language to the interface, we will give an introduction to Fuzzy Logic.

Imagine, you are in a car on the road. You have to adjust your behaviour to the surrounding traffic and keep a certain distance to the car in front of you. Therefore you observe, amongst others, the speed of the car and the distance to the next car. With the help of this information, you will apply the brakes, accelerate, etc.

Actually, you receive two inputs, velocity and distance, and deduce from these the output, action. This deduction process is simulated. Before this can be done, however, the variables have to be defined.

To keep this example simple, the different variables are subdivided into a few parts. Velocity is divided into slow, average, and fast. These are called members.

Figure 7:
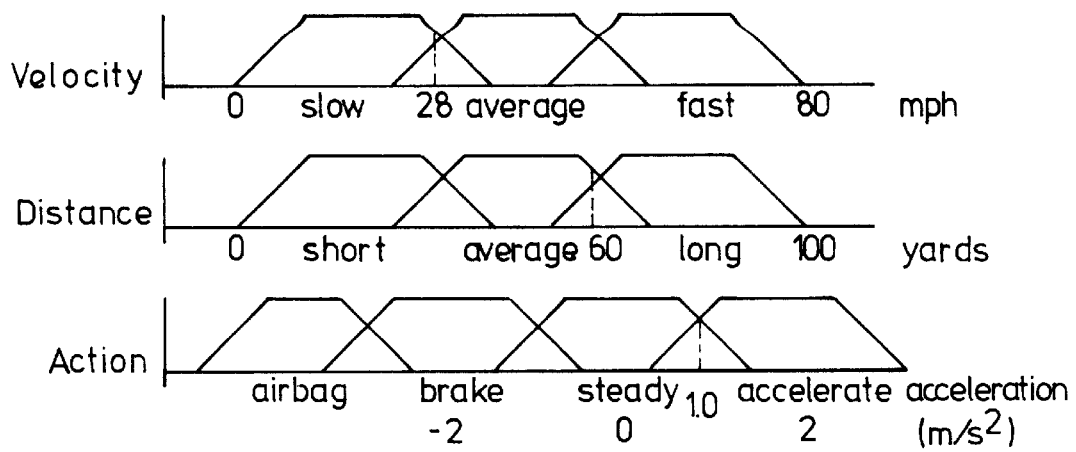
FIG. 7 shows membership functions for input variables "velocity" and "distance" and for output variable "action"

Each member is defined on a certain interval of its variable: the membership function. Slow starts at about 10 mph. and continues till 35 mph. etc. Slow is really slow if its graph reaches the top (15–30 mph.). The interval of 25 till 35 mph. is somewhat slow and somewhat average. 25 mph. is very such slow and a little bit average. 30 mph. is half slow half average, and 35 mph. is a little bit slow and very much average. For distance and action, an analogous reasoning holds. This means in a certain interval more than one member can be active. This provides for a smooth transition of one member to another. Membership functions can be portrayed as any type of diagram: from bellshaped ones to triangles, and everything in between. This is explained in FIG. 7, showing the membership functions for two input variables (velocity and distance) and for the output variable (action).

Action subdivides the whole of different actions which can be performed.
Following is part of a rule base, belonging to these variables. Velocity and distance are called antecedents, action is called the consequent. From this example, it follows that each variable at most may be used once in every rule.
if velocity is slow and distance is long then action is accelerate
if velocity is slow and distance is short then action is brake
if velocity is average and distance is average then action is steady
if velocity is fast and distance is long then action is accelerate
if velocity is fast and distance is average then action is steady
if velocity is fast and distance is short then action is airbag The deduction process is simulated by evaluating the rule base. Every rule in the rule base covers a small part of the total area of different combinations. If a rule base is well defined, the complete area will be covered.

For any two values (within range) of velocity and distance, the different members of these variables have a certain degree of membership, ranging from 0 (none) to I (total). The higher the degree of membership of one particular output member, the larger its influence on the ultimate outcome. In each rule, these values are filled in, obtaining the degree of membership of the output member for that rule. This is in fact the degree of truthfulness of this rule. The different degrees of membership of one output member are accumulated and then a defuzzification method is applied yielding the ultimate outcome. The following table shows an example of a combination of the inputs. Both velocity and distance are not exactly defined: velocity is somewhat slow and somewhat average; distance is somewhat average and somewhat long. This means several rules can be a little bit active, leading to more than one active output member. In this example the minimum of the antecedents is used as the value of the output member. Both accelerate and steady are for 0.4 true, leading to a value somewhere in between accelerate and steady.

| slow | 0.6 | long | 0.4 | accelerate | 0.4 | |
|---|---|---|---|---|---|---|
| slow | 0.6 | short | 0.0 | brake | 0.0 | |
| average | 0.4 | average | 0.6 | steady | 0.4 | action |
| fast | 0.0 | long | 0.4 | accelerate | 0.0 | 1.0 m/s$^2$ |
| fast | 0.0 | average | 0.6 | steady | 0.0 | |
| fast | 0.0 | short | 0.0 | airbag | 0.0 | |

Example with Velocity=28 and Distance=60 results in Action=1.0

There are many methods to obtain the degree of membership of an output member. There are also many ways to get the ultimate value of the output. The former may be obtained by using the minimum or the maximum degree of membership of the antecedents; the latter may be yielded by taking the weighted average.

The larger the number of members the more accurate the outcome will be, but on the other hand the number of different rules becomes very large. The golden median has to be found.

Below, the use of Fuzzy Logic will be explained.
The model used consists of seven basic emotions. Like color, any possible emotion should be retrieved by using the basic emotions. Therefore some structuring in emotions will have to be accomplished.

Figure 8:
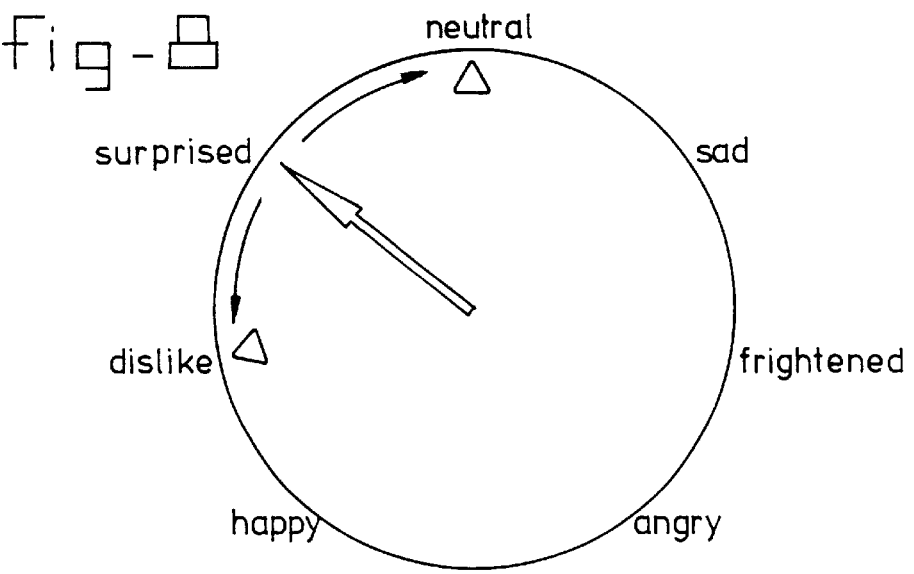
FIG. 8 shows a polar diagram.

Relationship with all basic emotions: In all cases, a new emotion must have a relation with at least two basic emotions, to fill the space in between basic emotions. In fact, the polar diagram of FIG. 8 gives an example, but it only works for two neighbouring basic emotions. Relations between two non-neighbouring emotions will lead to another emotion, other than those between which the relation exist. The order in which the emotions are placed determines which other emotions can be made. Of course, this is a very unpleasant feature. If the user specifies a relation between neutral and dislike, the unintended thing happens: the emotion surprised unintentionally becomes part of the relationship.

To overcome this problem, the order in which emotions are placed may not play a role anymore. The underlying problem to these methods is the user, who wishes to oversee the relationships instantly. This can be realized if there are no more than three actors, because dealing with n variables leads to a picture in n-dimensions. In our model, we have to deal with at least seven different emotions (actors), which means the visual relationships will have to be removed.

The relations between the new emotion and the basic emotions have to be specified for each basic emotion separately. This relation expresses the degree of conformity between the new and the basic emotion. It does not give information about the velocity of the new emotion. With the previous methods, this was enclosed by the specification of the emotion.

Relationship with all emotions: Again, as with the extension of relationship with one basic emotion, this only means a refinement of the specification. Not the velocities but the conformity can be given in more detail. But because you simply run out of emotions after a while, they will be added as emotions with a certain kind of velocity, and not as completely new emotions. Nevertheless, this seems to be a meaningful extension, because you can connect newly created emotions to create a new emotion, without having to go back to the basic emotions. And the relationship between the motions which are closest is such more clear. In view of the previous points, we choose this method.

The relationship between a new emotion and an existing emotion has to be specified. It pictures the partition of an emotion into parts whose sizes represent the degree of conformity between the new emotion and the others. In fact, all other emotions can be represented by a slice of pie of size 0.

The partitioning does not have to be specified in exact values, because it is completely subjective: differences of some percents are not noticed. Therefore the accompanying percentages are left out of the picture. This means 'in the neighbourhood of' values have to be used. Here comes Fuzzy Logic into perspective. For the user, it would be easiest if natural language were used. The foremost advantage of Fuzzy Logic is that it implements this feature.

A description of the classifiers will fall into a range of values. This could be done with membership functions. Each variable gets its own membership function which represents the range in which this variable is active. The total range is formed by the set of membership functions.

The membership functions cannot be made by the user, because he should have knowledge of Fuzzy Logic, which opposes the fact that everybody could use the program. The user may specify different classifiers, and the program will add a corresponding membership function. Whenever a classifier exists, it can be used to specify the relation between a new emotion and other emotions.

If relations between different basic emotions can be made, tile gradation of an emotion will be lost. Only the degree of conformity is expressed by such a relation. Gradation of an emotion is in fact the speed of a motion. So this means there is no velocity enclosed: it must be given externally. The velocity provides for the speed with which a motion is performed.

The relations between different velocities are much simpler than those between different emotions. Just like the classifiers, values cannot be given in exact values, because this would not make sense. The idea is to use one bar on which all different velocities are given. A new velocity can be specified by placing it on the bar. The place on the bar will determine its value.

Another point belonging to velocity is the following: an adverb can have more than one meaning, if used with two different motion groups. For example, 'walking fast' and 'talking fast' are two notions which can be loaded with fast, but it has very different meanings, indeed. However, both have more or less the same value, so probably this will not be a problem.

With motion groups, there is an advantage: whenever a combination of emotion and velocity does not exist for a particular motion in the library, the program can search for a combination which resembles the desired combination best. The fact that a certain combination can possibly stand in for another combination will increase the usability, and decrease the time to generate programs.

Curious, but yet powerful features of natural language are the smooth transitions of closely related motions. 'talking loudly' and 'calling softly' are almost the same actions, with the same facial expressions and equal exclamations, while 'calling' and 'shouting' are certainly different actions. It is the accompanying adjectives which instinctively bring these actions together. This means one particular motion can be in different states by only modifying the adjective. By adding an adverb, one motion can join different motion group than its own.

Figure 9:
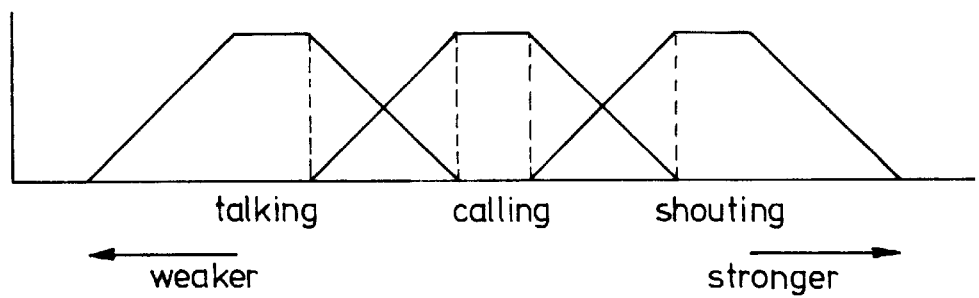
FIG. 9 shows relationships between different motion groups.

It is possible for two neighbouring actions that their regions will intersect partly. FIG. 9 shows an example with talking, calling and shouting. The dark grey areas are the intersecting parts of two different motion group. If adding the adverb 'loudly' to talking, the motion will become stronger and shifts into the dark grey area.

Building these relationships into the motion editor 7, a very powerful tool will be the result. By adding an emotion or a velocity to, for example, calling, not only calling will be examined, but also talking or shouting, depending on the accompanying emotion or velocity.

The scheme sketched above can easily be converted into terms of fuzzy logic. In fact, fuzzy logic does exist because of natural language, assuming natural terms do not represent one exact value.

The user will build up his motion groups, which excludes a standard partitioning of the membership functions. The program can present the user a range of different relationships and/or membership functions, from which the user can choose one.

Or, in a rather progressive but complex way to handle, to provide a set of fuzzy terms, which say something about the overlapping, parts of the membership functions. They can range from narrow to large. With these terms the user can specify the membership functions. The program has to gather from this information the right kind of relationship.

When searching for a movement, the ones that fit best will be returned. If an exact fit is found, only this one will be returned. But if the movement is not available, we can decide to return only the best one. If the emotion (for example) is not quite the right one, it might be possible to retrieve a movement with an emotion 'on the other side' of the desired one (if available, of course). Then these two motions could be combinend with each other, resulting in an emotion which is closer to the desired one than any single movement alone.

Anyway, this 'method' is worth while to be investigated, we think. In fact, we are dealing with a vector space of seven dimensions because of the seven basic emotions. And there has to be found a counterpart of the motion with the first emotion which need not exist. With velocities this method can work.

The fuzzy relationships between the objects described in the previous sections serve a purpose. If the user specifies movement in the editor 7, it is very likely there are motions which do not have an entry in the library with the desired emotion and velocity. The fuzzy specifications of the emotions and the velocities take care of finding the closest emotion combined with the closest velocity in this particular motion group. And the fuzzy relationship between motion groups will do anything possible to return an acceptable movement. The combination of these fuzzy-based topics will yield the best result actually possible.

The structure of the model can be split into the primary and the secondary structure. The primary structure sets the structure from which the shape of the figure can be recognized, e.g. legs, arms and the back. The secondary structure consists of segments which can be left out, without changing the structure of the model, e.g. fingers. Because the primary structure sets the shape of the model, this structure is the most important.

Before the model can be used, it should be initialised. The initialisation of the model means the creation of all segments in the model, connecting the segments to their ancestor, and setting the values of the joint angles. The initialisation can be divided into two parts. The first part is the creation of the segment and connecting a segment to its ancestor. The second part is the setting of the initial values.

Two configuration files are used to initialize the model. The first configuration file contains data for the creation of the segments and connecting them to their ancestor.

The second configuration file contains data for the initialisation of the angles in the segment. Each angle of a segment has a minimum and maximum value and an offset.

Movements have to be sampled. This means that a continuous movement of the figure has to be divided into discrete states. Each state specifies the posture of the figure at time $t+\Delta t$, where $\Delta t$ is the sampling time. Each posture is stored in a frame. The structure of a frame is built up as follows:

The state of a joint is specified by three values (roll, yaw, and pitch), combined with the id of a segment. Frames can be combined to a framebuffer, which specifies the postures of a figure in time, leading to a movement.

The angles, which set the state of the model, can be given as relative or as absolute angles.

The problem with absolute angles is that there is no relationship between two succeeding segments. It is not known how a segment is positioned with respect to the previous segment. It is not possible to check if the minimum or maximum bounds are violated.

Relative angles are measured with respect to the previous segment, which means that the origin of the model is part of the model itself. If relative angles are used, the model is not connected to an environment. This also means that it is not clear how a motion affects the position of the model in the environment. This problem can be fixed by choosing a fixed point in the environment, and measure the position of the base segment with respect to this fixed point. In this case only the base point has a relation with the environment.

Humans are always, one way or the other, connected to the environment.

If the base segment is connected to the real world, a fixed point has to be chosen to which the orientation segment is connected, This segment takes care of the orientation of the model in the environment. There are many candidates which could serve as fixed point.

The orientation segment is a segment with a variable length, and a variable fixed point. The variable length is needed, because the orientation segment also indicates the height of the figure. The fixed point is variable, because when walking the left and right foot alternately determine the position where the figure is connected to the environment. When the left foot contacts the ground, the left foot determines the fixed point. When the right foot contacts the ground, the right foot determines the fixed point. During walking, when one foot is placed onto the ground, and the other foot has not been raised, both feet contact the ground. At this moment the fixed point has to be changed. It seems that the center of gravity of the figure determines the position of the fixed point. In other words, the fixed point is a projection of the center of gravity on the ground.

A motion which is stored in the library can be split into two parts. The first part is the statistical data about the motion. The second part is the data of the motion itself. These two parts are stored in the same motion file. Notions are opened and closed for reading or writing by the low-level routine.

Events are actions which have to be executed at certain time intervals. The performing of a motion can therefore be seen as an event. If more than one motion has to be performed, a list of events is generated. In this event list the motions are sorted according to their starting time. The user interface communicates with the low level routines by the event list. When the story board is designed, an event list is created from the story board. This story board is then sent to the motion routines.

Inverse kinematics has to be used if the states of the joints are to be calculated from a given position of a certain joint. The inverse kinematics is a very difficult problem, because there are many solutions. Usually, the inverse kinematics is done by inverting the Jacobian matrix. Because this is very difficult, the inverse kinematics problem is solved using fuzzy logic. Method of solving the inverse kinematics problem using fuzzy logic are known to persons skilled in the art. The methods have to be adapted to work in the model that is implemented.

Data is usually not recorded in the format that is used in MEdCom. Prerecorded notions should therefore be converted and stored in the MEdCom library. Angles are now in MEdCom format if they are given in radials and relative to the previous segment.

Notions have to be scaled if the frame time of the motion is to be changed, if a new motion is created from two existing motions or if the speed of the motion is to be altered. The scaling factor specifies the way the motion has to be scaled.

The scaling factor is a value which is always greater than zero. If the scaling factor is equal to 1, no scaling is performed. If $0 < \text{scaling\_factor} < 1$, frames are removed and if $1 < \text{scaling\_factor}$, frames are added. The best values for the scaling factor are $\frac{1}{3} \leq \text{scaling\_factor} \leq 3$, because if the scaling factor is smaller or larger, too many frames have to be added or removed. This influences the lapse of the scaled motion too much.

When frames are added, at most two frames of the motion are combined to get a new frame. We create the new frame by taking the weighted average of two frames.

A general formula for the creation of new frames can be given. Therefore, 2 different cases have to be distinguished. A new frame is added by:

Copying the contents of the original segment. This case occurs when the starting time of the new frame is later than the starting time of the original frame, and the ending time of the new frame is earlier than the ending time of the original frame. In this case: $\text{frame}_{new} = \text{frame}_{original}$ Taking a part of the original frame and a part of the next original frame. This case occurs when the starting time of the new frame is earlier than the ending time of the original frame, and the ending time of the new frame is later than the ending time of the original frame.

Removing frames by combining old frames to one new frame looks like the creation of new frames. When frames are removed, original frames are combined to create a new frame.

A general formula of the removing of frames in the scaling routine is difficult to give, because at least five different cases have to be distinguished. The new frame can be generated by using:

One or more complete frame(s). If the new frame is generated from one old frame, no scaling is done.

One or more complete frame(s) and a part of the next frame.

A part of a frame and one or more complete frame(s).

A part of a frame and a part of the next frame.

A part of a frame, one or more complete frame(s) and a part of the next frame.

The library is built up completely modular. This has the advantage of being very flexible.

Each library file contains its own binary tree. This means an entry can be found in quickly. It depends on the search criteria, of course, which information can be found quickly. Other information, if any, can only be found through linear search, meaning every element in the library file has to be inspected until the right one is found.

Almost each library file contains some kind of strings, like descriptions of movements and emotions. Strings are annoying things to handle, because of their undetermined size. This leads to the exclusion of character strings from the library files.

Clearly, the consequences of deleting elements are large. Overseeing this, we have decided to forget about the removal of elements. In general, this will not be a problem, for the number of elements which will be deleted are insignificant in comparision to the number of elements which will be added. Of course, deletion could always be implemented. For now, new elements are added to the tail of the file, ignoring any free space inside the file.

One way to store data is with hashing techniques. Hashing has too many disadvantages to be used.

Figure 10:
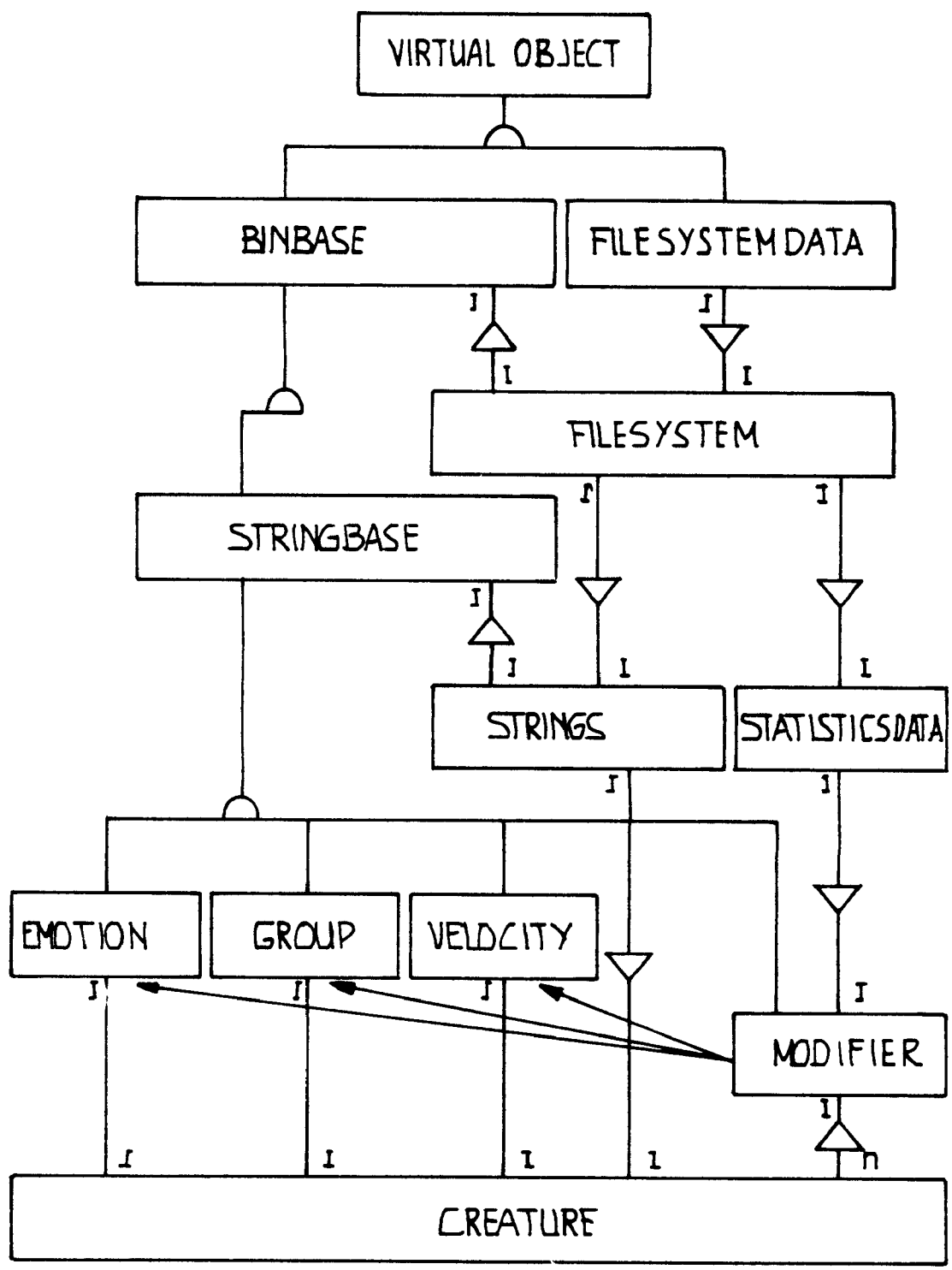
FIG. 10 shows a possible layout of a library used in the present invention.

The library is so complex that it needs some explanation. With help of FIG. 10, some of the details of the library will be explained.

At the base of the library tree, there is the class VirtualObject. This class is purely an abstract class. Each element of the library inherits VirtualObject directly or indirectly.

FileSystemData contains information needed to manage files. One important piece of data is the number of users of one particular file.

BinBase implements the handling of a binary tree on disk. Therefore, it stores the id's of its left and right children.

Strings handles every string which is generated by the user. such as group names, labels and descriptions. Each string will be written to one and the same file (and files are still handled by File System).

StringBase implements the connection between the string database Strings, for use in subclasses, and the motion data. Via BinBase it inherits the binary tree structure.

The real data classes are EmotionBase, GroupBase and VelocityBase. In addition to the tree information, these classes provide their own information.

For EmotionBase, currently the relations with the seven basic emotions are stored.

For GroupBase, the connections with the slower version and the faster version (which are both groups) are stored.

For VelocityBase, only the strength is stored.

Figure brings the three classes mentioned above together. Per Figure, only one EmotionBase, GroupBase and VelocityBase is kept.

StatisticsData is only used to put through the information from ModifterBase to the FileSystem.

ModifierBase stores one recorded or generated motion with one emotion and one velocity. A Modifierbase file contains only motions from one and the same motion group.

One type of compression has already been implemented: only the segments with changing angles are stored. Another type of compression we have implemented is Lemple-ZivWelch coding. It is an adaptive method.

The segments have to be connected as described, so to add a segment to the model, the ancestor of the segment has to be given. Because the ancestor must exist, the ancestor of the first segment will be the base, which is provided by the program. Right now, it is not clear how flexible segments, like the back bone, will have to be specified. The current option, with the segment divided into several smaller subsegments, is implemented. For each angle which is selected, the minimum and maximum deflection (Roll, Pitch and Yaw).

In the order area the order of calculation of the different angles can be specified. Defaults reset the adjustments of the current segment, but does not affect the model immediately. Apply fills in the adjustments of the current segment into the real model, thus changing the model. Delete removes the current segment from the model. Child segments will receive the ancestor segment of the removed segment to be the ancestor, and the ancestor receives the children of the removed segment. Reload loads the last configuration of a certain figure, and Save saves every adjustment made. The next time the model is loaded, this new configuration will be used.

With the configuration window, a viewing window is popped up, in which the current adjustments are shown by a stick figure. The current segment can be highlighted to control the adjustments made to this particular segment.

To show the model, the starting segment is the base, which occurs in every figure. From this point on, all its children have to be traversed, and their children's children, etc. In section 4.4., we will discuss some other points about drawing the figure in its environment.

The viewer consists of the following parts:

A control panel with the following buttons:

1 (pause) The movement is stopped when activated, and resumed when deactivated.
2 (rewind) The movement is rewoud fast, or when the play button is active, the movement is quickly played backwards.
3 (play) Any movement or program can be seen by using the play button. Press again to deactivate or use the stop button.
4 (wind) The movement is wound fast, or when the play button is active, the movement is quickly played forwards.
5 (record) This button could be used to select parts of movements or to record a trace of the viewer.
6 (Stop) The stop button can be used for several reasons. It will deactivate any active button.
7 (previous) The viewer will search for the previous movement, and resume playing when the play button is active.
8 (slow) The number of frames per second will decrease when this button is pressed. The movement will be played slower.
9 (fast) The number of frames per second will increase when this button is pressed. The movement will be played faster.
10 (next) The viewer will search for the next movement, and resume playing when the play button is active.

A drawing area. In this area, the figure is shown.

An information area. In this area, the current frame number, the current playing time and the current number of frames per second are shown.

A button area: Reset will reset the figure to its original position. Close will shut down the viewer.

To be able to view the figure from any side, the mouse buttons are functional. If the mouse buttons are pressed inside the drawing area, any view can be obtained by dragging the mouse in certain directions. The changes which are implemented in the viewer are Rotation, Translation and Zoom.

When connecting the figure to the 'real' world, this has to be made visible to see the effects. Therefore 3 dimensional effects have to be included into the viewer, such as a horizon and a walking platform. Therefore we need a permanent connection to the world.

A possible solution to this problem is by freezing the current state of the model, and to determine the exact position of the selected segment. This segment will stay for the next frames at this position till the fixed segment is changed. A point of concern is the calculation of the state of the model with a fixed segment which is different to the base segment. The base segment is the ancestor of all the other segments, so knowing the position of this segment, all other positions will follow. But when the base segment is not the fixed point, the position of the base segment (and the segments in between) will have to be calculated from the position of the fixed one. The position of the fixed segment must always be calculated first. When the fixed segment is reached, the way back to the base has to be found. The order of calculation of the different angles has to be reversed, for now the ancestor is passed after his child. When the base has been reached all calculations are performed as previously done.

Of course, there are problems with this method. For example, when alternately freezing a foot when walking, the figure will walk out of the drawing area. This can only be prevented by letting the viewer perform a trace at the same time. Nevertheless, this method would already make quite a difference.

The main area is used for specifying the movements. Here as many timelines as needed can be placed. On these timelines the actions reside which are represented by rectangles. The first line shows the time in seconds. The reason for selecting actions is to remove them or to unfold actions into the underlying actions. When an action is selected, the accompanying description of the timeline is also highlighted. This can be used to remove timelines.

Currently, scrolling can only be accomplished by using scroll buttons, but in the future, the desired frame number ought to be given. In the horizontal scroll area, beside the buttons, there is a line which shows the complete time interval in which actions are specified. With this scroll bar, a particular spot can be found very quickly.

At different stages when composing a movement or a program, different parts of the timelines have to be shown. This not only means that other actions have to be shown, but also more or less actions. Therefore it is necessary to be able to change the number of frames pictured. This can be arranged by zooming in or out. If needed, one frame to several thousand can be shown at a time. Currently, this can only be accomplished by using the zoom buttons, but it should also be possible to actually let the user specify the number of frames or the time interval to be shown.

Actions can be selected and positioned in time by using timelines. Timelines are half infinite lines which start at 0 and go on forever in the positive world.

The timelines of the editor 7 are represented by a doubly linked list of doubly linked lists. The number of timelines will not become that many that it is necessary to use a doubly linked list, but the reason for taking this kind of list is that it is easier to scroll vertical. The first list connects the timelines, and each timeline consists of a list of actions.

Actions can be unfolded to reveal the inside. This can be done as long as there is a description for a part of the movement. When the movement is completely transformed into exact angle values, no unpacking can be done.

For timelines there are only two actions implemented: adding and deleting.

It is very simple to add actions to a timeline. Just point the mouse onto the right timeline. Search for the right starting time on this timeline, and press the left mouse button. Drag the mouse to the right ending time and release the button. Actions may not have the right length, meaning the time interval the action is carried out is just not right. This can be resolved by resizing the action to the correct time by dragging the mouse. Actions can only be deleted by pressing the delete action button.

Whenever a program is built, changes made to this complete program results in transitions being lost. To prevent from recompiling all transitions, the changes have to be recorded. This can be stored in a list, with the starting frame and the ending frame kept for each change made. Changes which translate the movements one way or the other, will affect the frames in the list.

Because velocities have to be (or are) specified for each movement, it is clear what will happen when stretching a cyclic motion: the motion will be repeated as often as needed to fill the complete time interval of the action. The stretching of a non-cyclic motion on the other hand is a problem. When leaving the velocity unchanged, the movement will be cut off, when the space is too small, or the figure will stay in a certain position, when the space is too large. When exactly filling the space of the action, the movement will be slowed down or speeded up, opposing the accompanying velocity. On the other hand, you could forget about the velocity which belongs to this movement, and only rely on the size of the action. The movement is stretched to perfectly fit the time interval. Cyclic movements will also be stretched; in general only one cycle is available in the library so the movement will consist of just one stretched cycle. The old velocity could be used to determine the new velocity.

Obviously the best way to handle is to provide both options to the user.

If there exist no such thing as a limit for the number of used emotions to describe an emotion, the emotion and its relations could be separated and stored in two different files.

Right now, a very brief version of the combining of different motion groups has been implemented which is only meant for testing. In this version standard membership functions were used, meaning half of the membership functions of two neighbouring variables were overlapping. Further some fake motion groups, emotions, and velocities were used and randomly initialized.

In the on-line phase, the program has to be aware of the state of the figure after an update. Therefore each frame of data has to be sent, performed if possible, and the actual, resulting frame has to be sent back.

In the model, the joint is at the beginning of the limb. The model includes a flexible back. This flexible back should be used to make the back curve.

To use the flexible back between the normal joints in a smooth way, we decided to implement the model using C++. An advantage of using C++ is that it is very easy to add functionality to the model and to add new parameters to it. The implementation is now completely independent on the data structure that is used for the model.

Library routines are used to store the motions, The library routines are transparent concerning the kind of data that is stored in the library. The motions are now stored in the library in the form of a framebuffer. How this framebuffer is designed, is described below. The data of the motion and the statistical information are now written into the same library file. The statistical information is written at the beginning of the file, the data of the motion is written after the statistical information. At this stage, the class Motion is developed.

Of a cyclic motion, only the cyclic part is stored in the library. Because the motion is cyclic, it is not important with which frame the cycle is started. The frame that matches the current position best can be chosen as the starting frame. A transition is then created to this best matching frame.

The best matching frame is the frame which angle values approach the angle values of the current position. Also, should the duration of the transition that is created from the current posture to the starting frame be as short as possible.

Fuzzy Logic is still a very small subject of scientific research. It seems to be used more and more like a computer language—a translation product that allows the programmer to produce a program in high-level constructs which are then translated into actual machine codes. It brings the software closer to the user, so it becomes easier to communicate in natural terms. The translation from natural terms into exact values still has to be done, but it can be specified in a more or less loose way.

Experiments were conducted to see if motion could be combined. Transition between two walking motions at different speeds were created. The transition was created by each time taking one frame from both motions and combining this motion by taking the weighted average of both frames. After each created frame, the weight was changed. In this way, the influence of the first motion on the new frame decreased, and the influence of the second motion increased. In this way a transition is created that connects both speeds in a smooth way.

Also experiments with the starting of cyclic notion were conducted. In the recorded cycle searches for the best matching frame were carried out. The best matching frame is the frame which values approach the values of the starting posture most. From the starting posture a transition to the best matching frame was created. The frames for this transition were created by interpolating between the frame of the starting posture and the best matching frame. Although this transition was created by interpolation, it looked human.

Another motion was created by just interpolating between two points. The motion was created by specifying a starting angle and an ending angle of a couple of joints. The amount of steps in which the joint had to move from starting angle to ending angle was given. The frames were created by interpolation. This motion looked very natural, although nothing human was added to the motion.

From these experiments it was concluded that motion looks human very quickly. Maybe because the viewer sees the motion of a human figure he assumes the motion is human too. This fact can be used in the creation of the transitions. No complex transformations have to be done to make the notion look human.

From an analysis on the prerecorded motion and the predicted motion, it was seen that prerecorded motions contain a lot of noise. Because of this noise, small details in the motion cannot be seen, and it is also difficult to extract features from the notion.

Experience has learned that everyone who records motions uses his own format for storing the motion. The motions we received were, therefore, all stored in a different format. For each different format received, the conversion routine to convert the motion from the recorded format to the format used in the library had to be changed.

Because nothing is set up about how motions will be recorded or about a storing format for recorded motions, it is preferred that all motions are stored in the format described below.

Angle values should be given in radials.

The value of the angles should be given relative to the previous segment.

The order of the angles should be roll, yaw, pitch.

A motion should be recorded as a collection of consecutive frames.

In a frame, the angle values of all used joints should be recorded.

The angle values of ajoint should be recorded as a combination of ajoint id and three angle values.

In a separate file should be written which id corresponds with which segment name.

If all motions are recorded according to this rules, a conversion routine can be implemented, which stores the motions in the MEdCom library. This prevents that a conversion routine has to be written, or has to be adapted for each new kind of motion that is recorded.

The present invention has been described above with reference to movements of a doll 1. However, it will be clear that the invention is not restricted to a doll 1 which resembles a human. The principles of the present invention can also be applied to apparatus which, for example, resembles animals.

What is claimed is:

1. Installation for controlling a movable apparatus (1) resembling a living being, or a two-dimensional simulation thereof, which apparatus is provided with artificial limbs, with means (3) for receiving a control signal and with means (2) for generating drive signals for the artificial limbs, which installation comprises:

a user interface (5) provided with input means (13) for the entering of commands by a user (4), a central processing unit (6) which is connected via a first communications line (11) to the user interface and comprises:

first memory means (20) storing pre-recorded basic movement data of the apparatus (1);

read means (8) to read data from said first memory means (20);

editor means (7) to receive said data from said read means and to calculate transitional movements between subsequent basic movements and to move the apparatus accordingly, such that an orientation of an artificial limb at the end of a basic movement is equal to an orientation of said limb at the start of a subsequent transitional movement and that an orientation of an artificial limb at the end of said subsequent transitional movement is equal to an orientation of said limb at the start of a subsequent basic movement, characterized in that said editor means (7) are also arranged to calculate said transitional movements such that the speed of change of the acceleration of the limbs is selected to have a minimum value for a desired speed.

2. Installation according to claim 1, characterized in that the installation is also provided with second memory means (21), provided with emotion movement data relating to pre-specified movements of the apparatus (1), which are linked to emotions of the being which the installation resembles, in that the read means (8) are also equipped to read from the second memory means (21) and in that the editor means (7) is also equipped to calculate the transitional movements in accordance with an emotion entered by the user (4).

3. Installation according to claim 1, characterized in that the installation is also provided with third memory means (22), provided with sound data, in that the read means (8) are also equipped to read sound data and in that the editor means (7) is also equipped to calculate the transitional movements in accordance with a sound entered by the user (4) and to provide a control signal, which also contains the sound data.

4. Installation according to claim 1, characterized in that the editor means (7) is arranged to receive commands from a user entered in everyday language and is loaded with fuzzy logic to translate said commands in machine codes.

5. Installation according to claim 4, characterized in that the editor means (7) uses seven basic emotions, i.e., neutral, sad, frightened, angry, happy, dislike and surprised, and is arranged to translate an emotion command of the user into a combination of said basic emotions using membership functions.

6. Installation according to claim 1, characterized in that the central processing unit is also provided with fourth memory means (19), equipped with software for simulating, on a monitor (13), expected movements to be made by the apparatus (1) on the basis of the control signal calculated by the editor means (7).

7. Installation according to claim 1, characterized in that the installation is also provided with an interface (15) for communication with an operator, which interface (15) is linked to the central processing unit (6) via a second communications line (16) and is equipped to supply data received to the central processing unit (6) for the first (20), second (21) and, respectively, third (22) memory means in accordance with predetermined movements, emotions and sounds, respectively.

8. Installation according to claim 7, characterized in that said installation is also provided with a data suit (18) for recording movements performed by living test beings, which data suit can be linked to the interface (15).

9. Installation according to claim 1, characterized in that the first memory means are storing the following types of basic movements with increasing priority:

"rest" basic movements which are selected when no other basic movements are specified;

default basic movements;

basic movements of limbs induced by movement of another limb;

directly specified basic movements.

10. Installation according to claim 1, characterized in that any basic movement is stored in a number of frames and that the editor means (7) is arranged to calculate combined movements of basic movements by scaling the number of frames of the basic movements to be combined.

11. Method for controlling a movable apparatus (1) resembling a living being, or a two-dimensional simulation thereof, which apparatus is provided with artificial limbs, with means (3) for receiving a control signal and with means (2) for generating drive signals for the artificial limbs, which installation comprises:

receiving a command via a user interface (5) provided with input means (13), reading pre-recorded basic movement data from first memory means (20);

calculate transitional movements between subsequent basic movements and move the apparatus accordingly, such that an orientation of an artificial limb at the end of a basic movement is equal to an orientation of said limb at the start of a subsequent transitional movement and that an orientation of an artificial limb at the end of said subsequent transitional movement is equal to an orientation of said limb at the start of a subsequent basic movement characterized by the step of calculating said transitional movements such that the speed of change of the acceleration of the limbs is selected to have a minimum value for a desired speed.

12. Method according to claim 11, characterized by the additional step of reading from second memory means (21) provided with emotion movement data relating to predetermined movements of the apparatus (1) which are linked to emotions of the being which the installation resembles, and the calculation of the transitional movements in accordance with an emotion entered by the user (4).

13. Method according to claim 11, characterized by the further step of reading from third memory means (22) provided with sound data and the calculation of the transitional movements in accordance with a sound desired by the user (4) and the provision of the control signal, which also contains the sound data.

14. Method according to claim 11, characterized by receiving commands from a user entered in everyday language and using fuzzy logic to translate said commands in machine codes.

15. Method according to claim 11, characterized by the simulation, on a monitor (13), of expected movements to be made by the apparatus (1) on the basis of the control signal calculated by the editor means (7).

16. Method according to claim 15, characterized in that movements performed by living test beings are recorded with the aid of a data suit (18).

* * * * *